United States Patent [19]
Campbell

[11] Patent Number: 5,992,802
[45] Date of Patent: Nov. 30, 1999

[54] CABLE SUPPORT

[75] Inventor: John Campbell, St. John, Virgin Islands (U.S.)

[73] Assignee: Campbell Design Systems, Puerta de Tierra, Puerto Rico

[21] Appl. No.: 08/856,354

[22] Filed: May 14, 1997

[51] Int. Cl.⁶ ............................................. F16L 3/22
[52] U.S. Cl. .................................. 248/68.1; 248/74.4
[58] Field of Search ................................ 248/68.1, 67.5, 248/62, 74.3, 68, 73, 49, 58, 74.4, 74.1, 70; 165/172, 162, 82; 174/135

[56] References Cited

U.S. PATENT DOCUMENTS

| | | | |
|---|---|---|---|
| Re. 26,011 | 5/1966 | Girard | 248/68.1 |
| 678,042 | 7/1901 | Sargent | 174/149 R |
| 2,354,919 | 8/1944 | Lockwood | 248/68.1 |
| 2,404,531 | 7/1946 | Robertson | 248/68.1 |
| 2,425,935 | 8/1947 | Hayman | 174/135 |
| 3,055,398 | 9/1962 | Tunnessen | 248/49 |
| 3,226,069 | 12/1965 | Clarke | 248/73 |
| 3,295,805 | 1/1967 | Girard | 248/68.1 |
| 3,414,220 | 12/1968 | Walker | 248/68.1 |
| 3,432,197 | 3/1969 | Albertine et al. | 403/110 |
| 3,523,667 | 8/1970 | Guerrero | 248/49 |
| 3,526,934 | 9/1970 | Owen, Sr. | 285/154.1 |
| 3,682,422 | 8/1972 | Evans | 248/68 |
| 3,856,244 | 12/1974 | Menshen . | |
| 4,030,540 | 6/1977 | Roma . | |
| 4,036,289 | 7/1977 | Cheng et al. | 165/82 |
| 4,099,626 | 7/1978 | Magnussen, Jr. . | |
| 4,131,257 | 12/1978 | Sterling . | |
| 4,202,520 | 5/1980 | Loos et al. | 248/68 |
| 4,729,531 | 3/1988 | Smith et al. . | |
| 4,769,876 | 9/1988 | Platt . | |
| 4,775,121 | 10/1988 | Carty . | |
| 4,917,553 | 4/1990 | Muller | 411/85 |
| 5,029,782 | 7/1991 | Andre et al. . | |
| 5,071,169 | 12/1991 | Moschet . | |
| 5,123,547 | 6/1992 | Koch . | |
| 5,167,388 | 12/1992 | Blair . | |
| 5,213,155 | 5/1993 | Hahn . | |
| 5,271,568 | 12/1993 | Schmidt | 248/58 |
| 5,271,588 | 12/1993 | Doyle . | |
| 5,316,244 | 5/1994 | Zetena, Jr. | 248/49 |
| 5,377,939 | 1/1995 | Kirma . | |
| 5,443,232 | 8/1995 | Kesinger et al. . | |
| 5,794,897 | 8/1998 | Jobin et al. | 248/74.4 |

FOREIGN PATENT DOCUMENTS

| | | | |
|---|---|---|---|
| 538730 | 8/1941 | United Kingdom | 248/68.1 |
| 544618 | 4/1942 | United Kingdom | 248/68.1 |
| 2165099 | 4/1986 | United Kingdom | 248/68.1 |

*Primary Examiner*—Ramon O. Ramirez
*Assistant Examiner*—Tan Le
*Attorney, Agent, or Firm*—Howson & Howson

[57] ABSTRACT

A support for parallel runs of coaxial cable is made up of pairs of molded blocks stacked on a single threaded rod. The blocks of each pair are identical, and have semi-circular cylindrical recesses which cooperate to provide circular, cable-gripping passages. The threaded rod extends in orthogonal relationship to the axes of the cable-gripping passages, through another passage located between two of the circular, cable-gripping passages, and cables can be installed and removed by loosening a nut on the rod, separating the blocks of a cooperating pair, and sliding the cables into and out of the recesses, without detaching any of the blocks from the rod. The blocks have interengaging ribs which prevent any pair of blocks from rotating about the rod relative to another pair of blocks.

5 Claims, 5 Drawing Sheets

CABLE SUPPORT

SUMMARY OF THE INVENTION

This invention relates generally to cable supports, and more particularly to supports for securing multiple cables, such as coaxial transmission lines or waveguides, to an antenna tower, building or other structure.

Where multiple cables are used, such as in cellular telephone or PCS (Personal Communication Service) sites, or CATV (Community Antenna Television) installations, it is desirable to arrange long runs of the cables in parallel relationship and to secure the cables to a tower, building or other structure by cable supports. Preferably, each cable support clamps all of the cables in a group of adjacent, parallel cables, thereby minimizing the number of separate supports required. For example, a typical installation may comprise twelve parallel runs of ⅞ inch diameter coaxial hardline, with cable supports spaced from one another by three feet.

In conventional cable installations, the supports are typically composed of molded blocks of polycarbonate. Each block has two or more semi-circular, cylindrical grooves. When two blocks are arranged in opposed relationship to each other, the grooves cooperate to form circular, cylindrical, cable-receiving passages. Preferably, when the blocks are brought together, the passages grip the cables gently, in such a way as to resist axial movement of the cables without deforming them and thereby impairing their electrical properties. Several pairs of blocks may be stacked on one another to accommodate two or more layers of cables.

In the conventional cable support, each block has two holes for receiving threaded rods used to secure the blocks together. The axes of these holes in a block are perpendicular to a plane defined by the axes of the semi-circular, cylindrical grooves in the block, and the two holes are disposed at opposite ends of the block.

One problem with the conventional cable support is that the cable-receiving grooves are situated between the threaded rods. Consequently, it is necessary to have the blocks completely detached from at least one of the rods in order to install the cables in the support. Especially in the case of a multi-tiered support, the need to detach the blocks from one or both supports makes installation and maintenance difficult. In a typical situation, a worker, at an inconvenient location well above ground level, needs to manage as many as six blocks and twelve cables as well as both of the threaded rods, and the other hardware needed to secure the blocks to the threaded rods. It is necessary to separate some of the hardware from the blocks during the installation of the cables in the blocks. Especially where four or more blocks are used, difficulties are encountered in maintaining the blocks in the proper relationship to one another while installing the cables.

Another problem with conventional cable supports is that the blocks are heavy and difficult to handle.

The principal object of this invention is to provide a cable support for multiple cables, which is easier to install than conventional cable supports. Another object of the invention is to provide an easy-to-install cable support which is lighter in weight, yet just as strong as, or stronger than, conventional supports.

A preferred cable support in accordance with the invention comprises two or more pairs of separable molded elements stacked on one another. The molded elements of each pair should be identical to each other, and, where the cables are all of the same diameter, preferably all of the molded elements in the cable support are identical.

Each molded element of each pair has an inner surface facing the inner surface of the other element of the pair. The facing inner surfaces have semi-circular, cylindrical recesses which cooperate to form cable-receiving, circular, cylindrical passages having parallel axes lying in and defining an imaginary common plane.

Each of the two molded elements of a pair also has an outer surface, on a side opposite to the surface having the semi-circular, cylindrical recesses. The outer surfaces of the elements of each pair face away from each other. Each pair of molded elements has a fastener-receiving passage located between two of its cable-receiving passages and extending in orthogonal relationship to the common plane of the axes of the cable-receiving passages. The fastener-receiving passage has openings in both of the outer surfaces, extends from one of the openings to the other, and comprises a first portion in one of the two elements and a second portion, in the other element, aligned with the first portion. A single elongated fastener, preferably comprising a threaded rod, extends through the fastener-receiving passages of all of the elements in the stack.

The inner surfaces of the elements of each pair have interlocking projections and holes to prevent the elements from rotating relative to each other about the axis of their fastener-receiving passages.

Interlocking means are also provided on the outer surfaces. With the pairs of molded elements stacked on one another, at least one outer surface of each pair of elements faces an outer surface of an adjacent pair of elements at an interface, and the interlocking means at each such interface are engaged to prevent rotation of the pairs of molded elements relative to one another about the axis of the fastener-receiving passages.

Preferably, the interlocking means on each outer surface comprise a pair of elongated ribs extending parallel to the imaginary plane defined by the axes of the cable-receiving passages and located on one side of the fastener-receiving passage, and elongated means extending parallel to the imaginary plane on the opposite side of the fastener-receiving passage. The elongated means of each element at each interface fits snugly, i.e. without allowing play, between the ribs of the other element at the same interface. The ribs also cooperate with a slot in a strut to which the cable support is secured to prevent the cable support from rotating about the axes of the threaded rod.

The threads of the rod extend beyond the stacked pairs of molded elements by a distance at least equal to the diameter of the largest cable-receiving passage in the stack. Therefore, a nut can be moved on the rod from a position in which it holds the pairs of elements together, to a position in which a cable can be inserted into or released from the largest cable-receiving passage by lateral movement of the cable without completely disengaging the nut from the rod.

The cable support of this invention requires only a single fastener in the form of a threaded rod and nut assembly, and the block elements can be separated from one another for insertion and removal of the cables without detaching the nut from the rod. This makes it easier for an installer to manage large numbers of cables and blocks. The cooperating ribs and elongated elements on the outer surfaces of the blocks prevent rotation of the pairs of blocks relative to one another and relative to the supporting strut, and produce a strong and reliable cable support.

Other objects, details and advantages of the invention will be apparent from the following detailed description when read in conjunction with the drawings.

DETAILED DESCRIPTION

Figure 1:
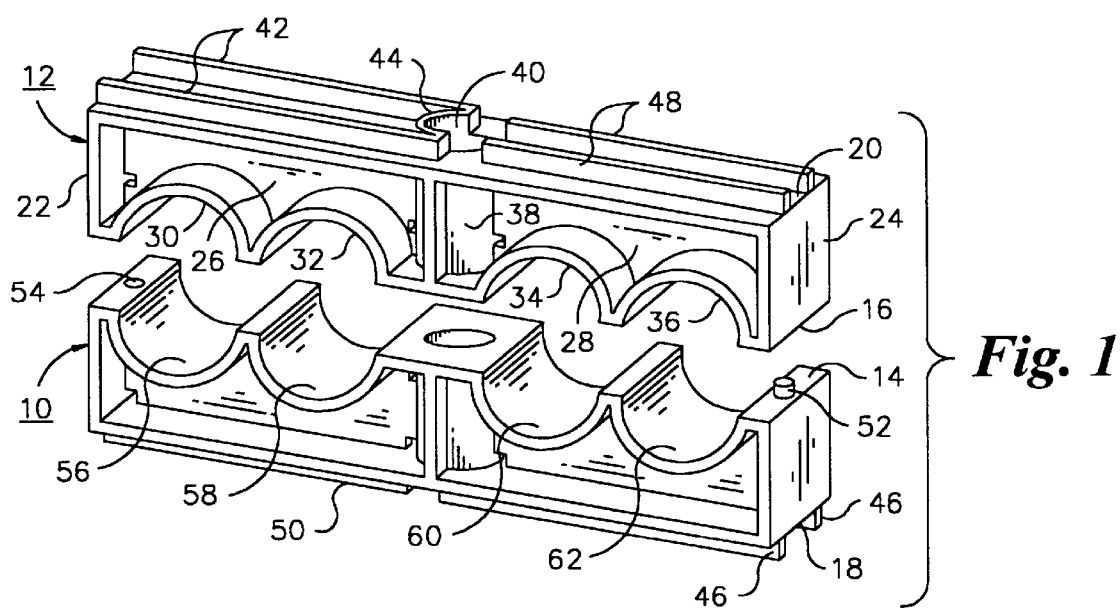
FIG. 1 is an exploded perspective view of a pair of cooperating blocks forming part of a cable support in accordance with the invention.

In FIG. 1, elements 10 and 12 are identical blocks, preferably molded entirely from polyvinyl chloride (PVC), an inexpensive, light-weight material having high rigidity and strength, and superior weather resistance. The two elements 10 and 12, are assembled with their inner surfaces 14 and 16 in facing relationship to each other. and with their outer surfaces 18 and 20 facing away from each other.

The surfaces 16 and 20, and side walls 22 and 24, of element 12, are in the form of a ribbon having generally a uniform thickness and disposed in a closed loop, the surfaces 16 and 20 respectively forming the bottom and top of the loop and the side walls 22 and 24 forming the sides of the loop. The inner faces of the loop are connected and reinforced by webs 26 and 28. The front and rear surfaces of webs 26 and 28 are in planes to which the surfaces 16 and 20 and the surfaces of side walls 22 and 24 are perpendicular.

Surface 16 is formed with four semi-circular, cylindrical recesses 30, 32, 34 and 36. Between recesses 32 and 34, a tube 38 extends vertically across the inside of the loop. The tube 38 has an internal passage 40 which is open to the inner surface 16 and to the outer surface 20.

The outer surface 20 has a pair of ribs 42 in spaced, parallel relationship to each other. These ribs are preferably of tapered, trapezoidal cross-section, and extend from a location adjacent to the upper opening of passage 40 to side wall 22. The ends of the ribs adjacent to passage 40 are connected together by an arcuate reinforcement 44. The corresponding ribs on element 10 are ribs 46.

Element 12 also has a pair of ribs 48 extending, in parallel relation to each other, from a location adjacent to the upper opening of passage 40 to side wall 24. The spacing of ribs 48 is such that their outer faces would fit snugly between a pair of ribs corresponding to ribs 42. Element 10 has a pair of ribs corresponding to ribs 48, one of which is rib 50, seen in FIG. 1.

Element 10 has an aligning projection 52 on surface 14 near one side wall, and an alignment hole 54 near the opposite side wall. When the elements 10 and 12 are brought together, projection 52 fits into a hole (not shown) in surface 16 of element 12, and hole 54 receives a projection (not shown) on surface 16, near side wall 22. These aligning projections and holes cooperate to ensure that passage 40 of element 12 is aligned with the corresponding passage of element 10, and that the four semi-circular, cylindrical recesses 30, 32, 34 and 36 of element 12 are in register the recesses 56, 58, 60 and 62, respectively, of element 10 to form cylindrical, cable-gripping passages. The thickness of each of the webs 26 and 28 is substantially less than the length of the shortest cylindrical passage measured in the same direction.

Figure 2:
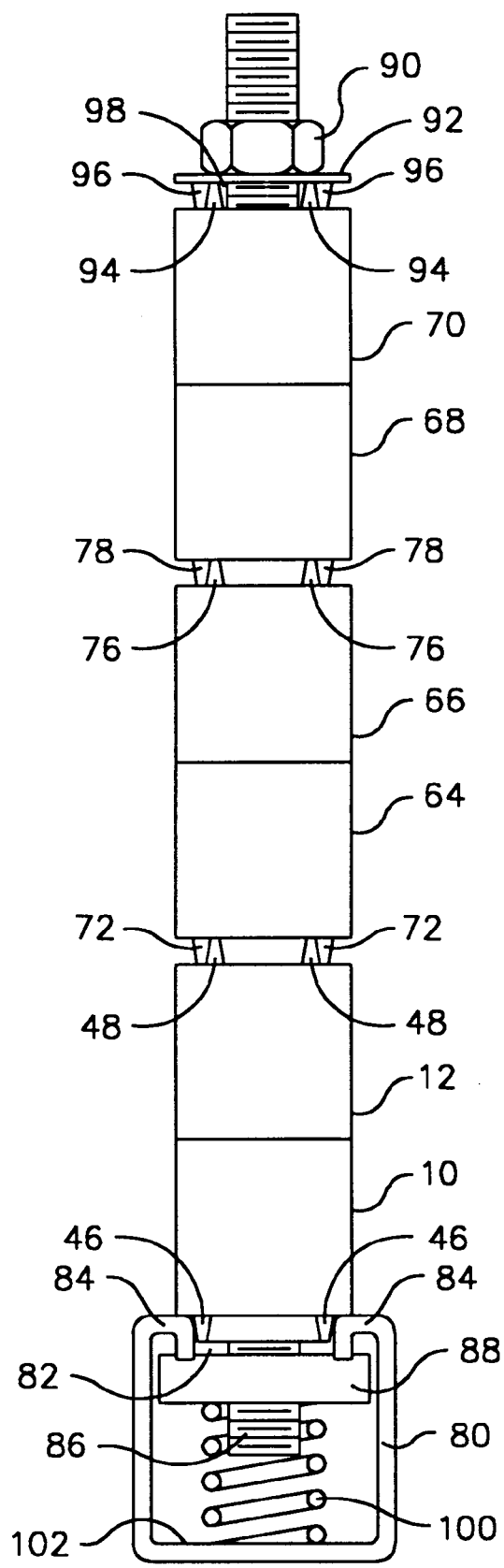
FIG. 2 is an elevational endwise view showing a cable support in accordance with the invention, comprising three pairs of blocks mounted on a channel-shaped strut.

Although the two elements 10 and 12, shows in FIG. 1, can be uses by themselves, to support four cables, a typical cable support in accordance with this invention comprises two or more pairs of elements stacked on one another in such a way as to accommodate several layers of cables. For example, FIG. 2 shows a cable support made up of three pairs of elements, for a total of six identical elements, 10, 12, 64, 66, 68 and 70. Ribs 48 of element 12, fit between ribs 72 of element 64. In a similar manner, ribs 76 of element 66 fit between ribs 78 of element 68.

The lowermost element 10 is mounted on a metal supporting strut 80 in the form of a channel with a slot 82 between opposed, inwardly projecting flanges 84 with downturned lips. The slot is just wide enough to receive ribs 46, and consequently, the element 10 cannot rotate or translate sideways relative to strut 80.

A threaded rod 86 extends through the aligned passages (corresponding to passage 40 of element 12) in all six elements, and is secured to the strut by a nut 88, which engages downturned lips on flanges 84. A nut 90 is threaded onto the upper part of rod 86, and is in engagement with a washer 92, which bears against ribs 94, and against ribs 96 and their arcuate reinforcement 98.

As seen in FIG. 2, element 70 is an endmost element of the stack, being spaced from the upper end of rod 86 by a distance less than the height of a pair of molded elements, e.g., elements 68 and 70, when together. Likewise, endmost element 10, at the bottom of the stack, is spaced from the lower end of rod 86 by a distance less than the height of a pair of molded elements, when together. Consequently, elements 10 and 70 are necessarily the endmost elements of the stack.

To facilitate engagement of the threaded rod 86 with the nut 88, the nut is urged upward against the downturned lips of flanges 84 of the strut by a coil spring 100. The spring is in compression against the bottom wall 102 of the strut. Consequently, it is not necessary to grasp the nut either manually, or by a wrench or other tool, in order to thread the rod into it.

The nut 88 can be tightened against the lips of flanges 84 of the strut by rotating the rod until its lower end engages the bottom wall 102 of the strut. This way, the rod can be secured firmly in place before the cable supporting elements are stacked on it. Alternatively, the lower end of the rod can remain spaced from the bottom wall 102 of the strut, and the nut 88 can be tightened against the lips of flanges 84 by rotating nut 90.

Figure 3:
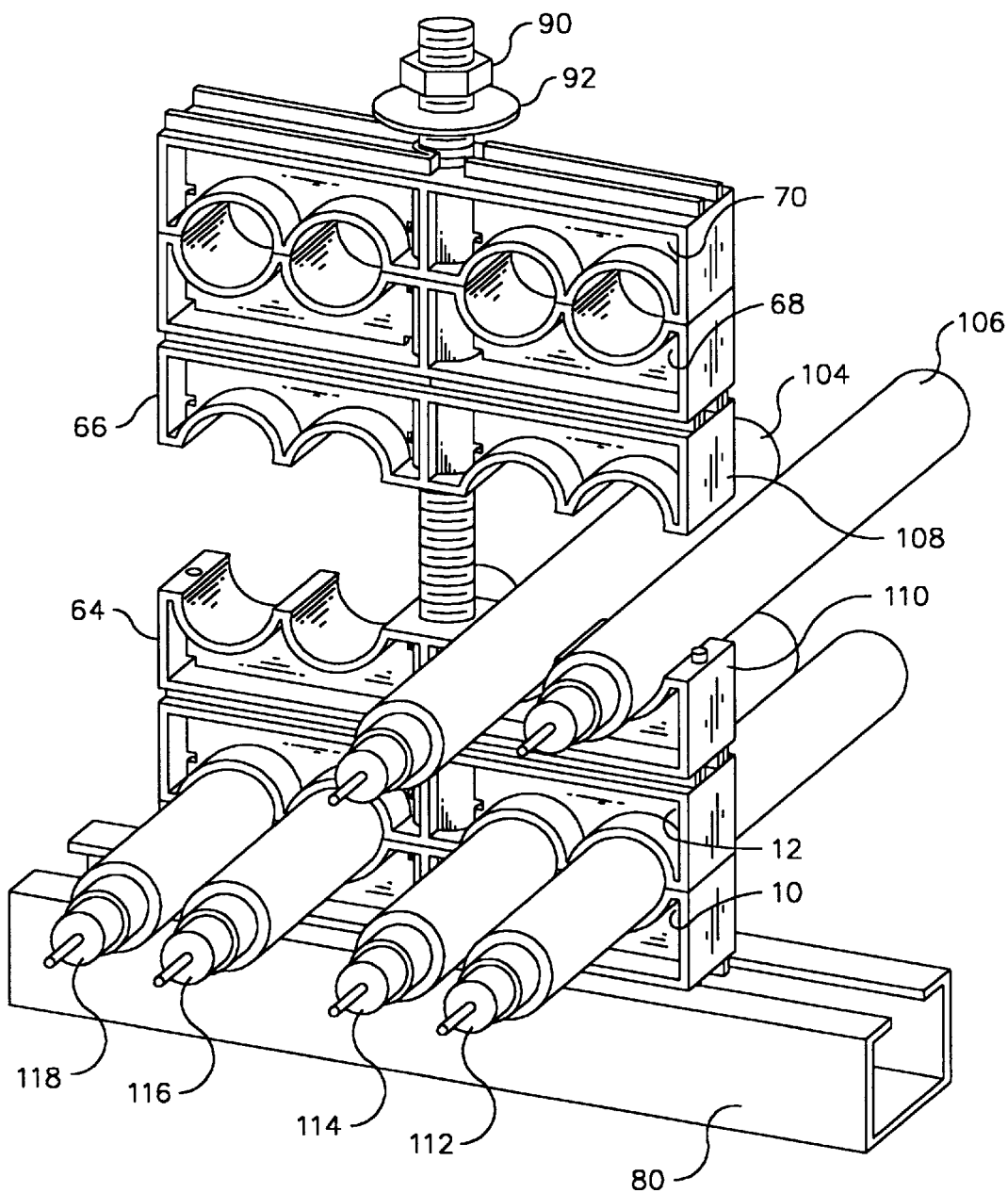
FIG. 3 is an exploded perspective view of the cable support of FIG. 2.

The length of the rod 86 must be such that, without removing nut 90 and washer 92 from the rod, the two cable supporting elements of any pair can be separated from each other sufficiently to allow sideways insertion of the largest cable that the cable support will accommodate. For example, in FIG. 3, elements 64 and 66 are moved apart from each other so that cables 104 and 106 can be inserted through a gap between side walls 108 and 110. Preferably, the nut 90 is loosened only enough to permit insertion of cables between one pair of cable support elements at a time. In practice, cables 112, 114, 116 and 118 are first installed between elements 10 and 12. Then cables 104 and 106, and two more cables are installed between elements 64 and 66.

Figure 4:
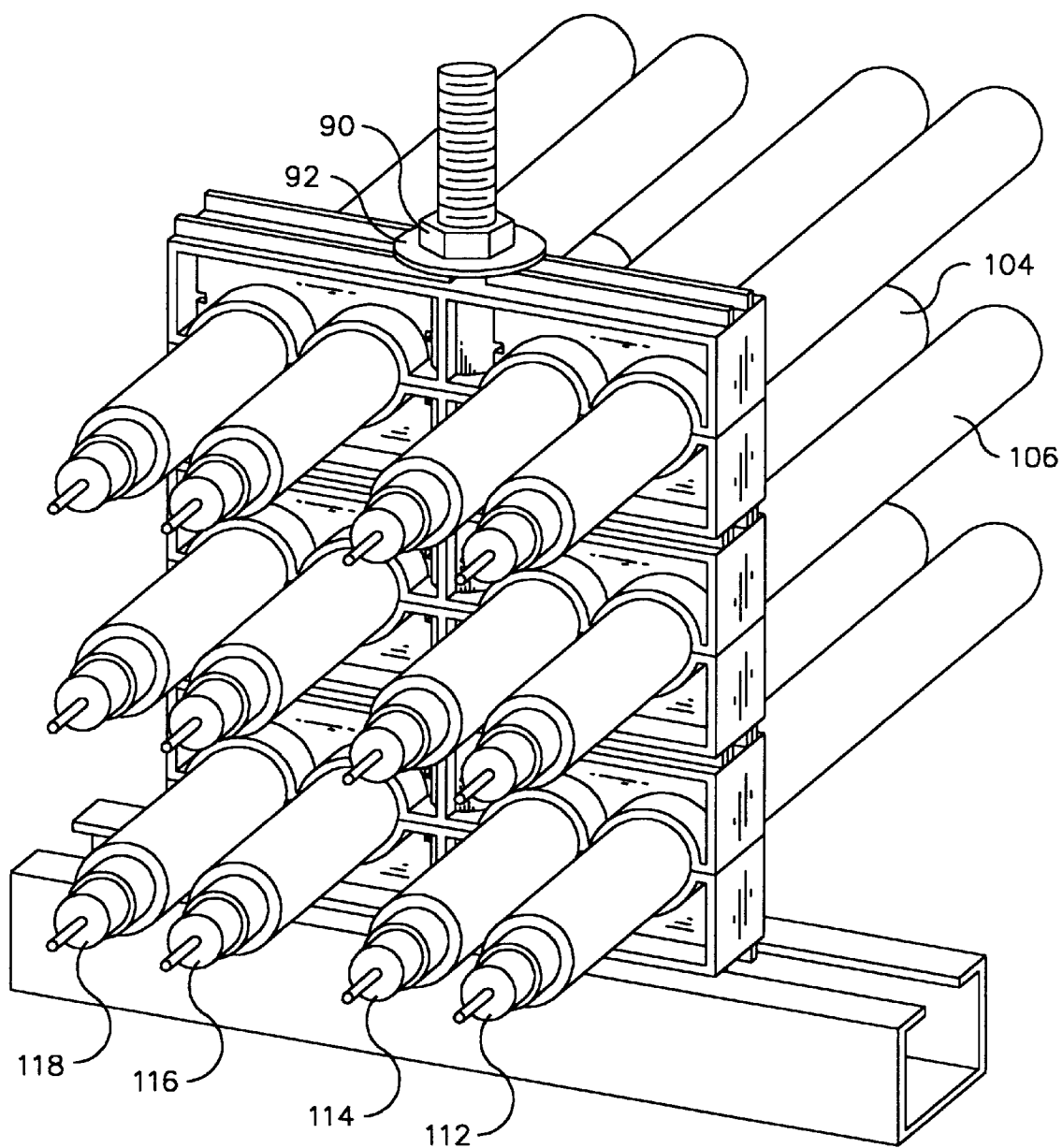
FIG. 4 s a perspective view of the cable support of FIGS. 2 and 3, shown in fully assembled condition.

Finally up to four cables are installed between elements 68 and 70, and the nut 90 is then tightened to complete the installation. The completed installation is depicted in FIG. 4.

As will be apparent from the above description, the cable support of the invention utilizes a single mounting rod, enabling the installer to carry out installation and maintenance more easily and quickly. Fewer fasteners are required, and, most importantly, the blocks in a stack need and their fasteners need not be completely detached from one another in order to install or remove cables. Cable support which is lighter in weight, yet just as strong as, or stronger than, conventional supports. The interlocking rib structure makes it possible to stack the blocks to form a strong and secure support for multiple layers of cable. Finally, the interlocking rib structure is such that the blocks can be identical. This reduces the number of different kinds of blocks that are needed.

Figure 5:
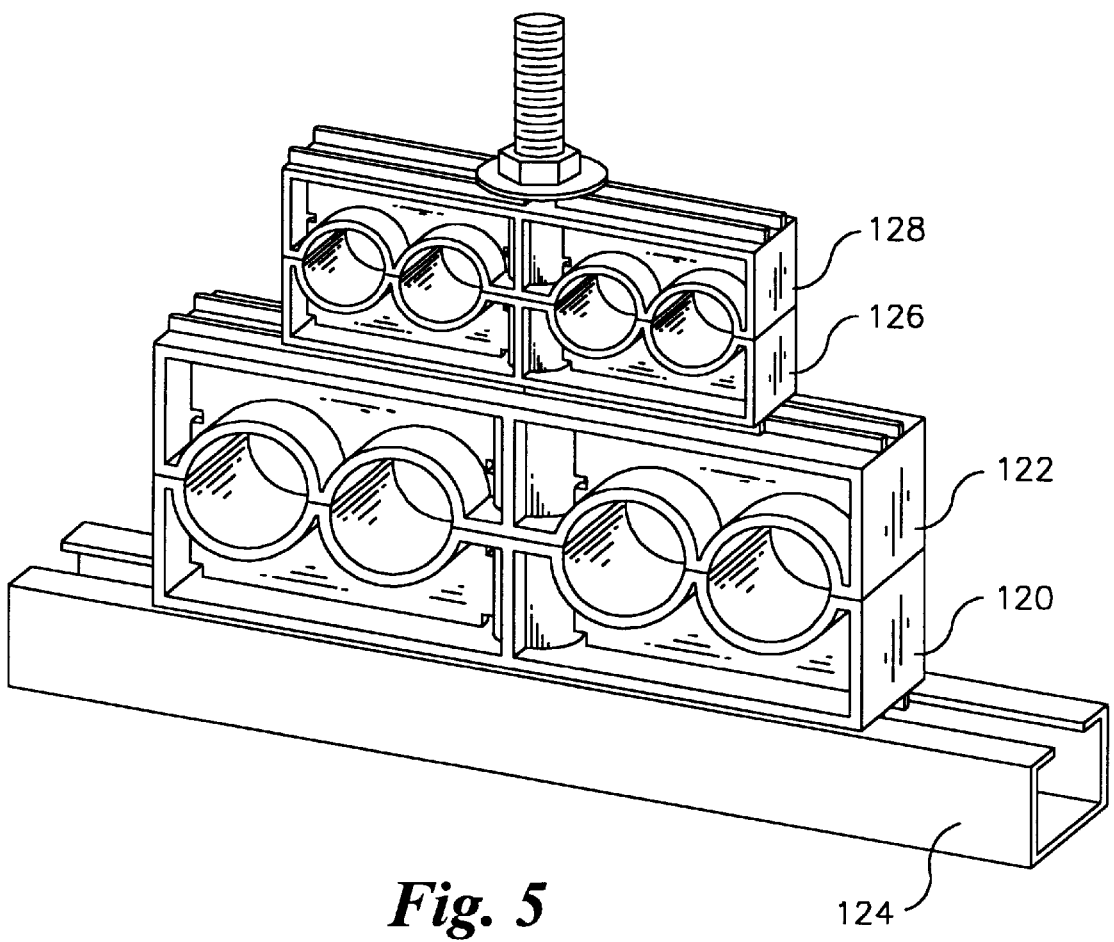
FIG. 5 is a perspective view showing an alternative embodiment of a cable support in accordance with the invention, comprising two pairs of blocks of different sizes.

Various modifications can be made to the cable support. For example, a cable support can include several different cable-supporting elements, to support different sizes of cable or different numbers of cables. In the installation depicted in FIG. 5, a first pair of cable supporting elements 120 and 122 is mounted on e strut 124, and a second pair of smaller elements 126 and 128 is mounted on top of element 122. The rib spacings on the different elements are the same. That is, each element has a first pair of ribs with the same spacing as that of ribs 48 (FIG. 1) and a second pair of ribs with the same spacing as that of ribs 42 (FIG. 1). Consequently the ribs of the smaller element 126 can interlock with those of the larger element 122.

Instead of using two spaced ribs corresponding to 48 in FIG. 1, a single, elongated rib, having its sides spaced by the same distance as the outer faces of ribs 48, can be used instead. Moreover, the spaced ribs (or the single rib, as the case may be) need not be continuous; each rib can be made up of multiple, discrete parts.

The threaded rod can be secured to a metal strut, as shown, or can be mounted to a wooden beam, embedded in a concrete block, or fastened to any of various structures such as a waveguide bridge or a waveguide ladder. The rod can be mounted vertically so that it extends either upward or downward from its mounting, or can be mounted horizontally or at an oblique angle.

The semi-circular, cylindrical recesses which form the cable-receiving openings, can be provided in various sizes to accommodate different cables, which typically have diameters ranging up to two inches. In general, the sizes of the openings should be such as to grip the cable firmly without distorting it. Thus, when the support is arranged to accommodate vertical runs of cable, for example on a tower or building wall, auxiliary hoisting grips should be used to secure the cables to the tower or wall, particularly when the vertical run of the cable is about 20 feet or more in length.

Still other modifications may be made to the apparatus and method described above without departing from the scope of the invention as defined in the following claims.

I claim:

1. A cable support comprising:

at least two pairs of molded elements stacked on one another, a first molded element of one pair being in engagement with a second molded element of another pair, wherein the molded elements of each pair are separable from each other and have:

cooperating semi-circular, cylindrical recesses providing a plurality of parallel, cable-receiving passages; and a fastener-receiving passage located between two of the parallel, cable-receiving passages and extending orthogonally to the cable-receiving passages;

the cable support having, and the molded elements being secured together in stacked relationship solely by, a single, elongated fastener extending along an axis through the fastener-receiving passages of all of the pairs of elements in the stack, the fastener being sufficiently long to allow the molded elements of any one pair to be separated from each other, without removal of any of said element from the fastener and without disassembly of the fastener, by an amount at least equal to the diameter of the largest cable-receiving passage in the cable support to permit lateral insertion of the cables without removal of said fastener; and interlocking means for preventing rotation of the pairs of molded elements relative to one another about the axis of the fastener, the interlocking means comprising a pair of elongated ribs on a first surface of each molded element, said ribs of each pair being spaced laterally from each other, and an elongated means on the first surface of each molded element, the elongated means of the first molded element fitting snugly between the ribs of the second molded element, and the elongated means of the second molded element fitting snugly between the ribs of the first molded element;

in which the molded elements of each pair are identical to each other.

2. A cable support according to claim 1 in which the fastener comprises an elongated rod extending through the fastener-receiving passages of the pairs of elements in the stack, and a nut attachable to the rod, and in which the rod is sufficiently long to allow the molded elements of one pair to be separated from each other, without removal of the nut from the rod, by an amount at least equal to the diameter of the largest cable-receiving passage in the cable support.

3. A cable support according to claim 1 in which all of the molded elements of the cable support are identical.

4. A cable support according to claim 1 in which the elongated fastener has first and second ends, in which one of the molded elements is an endmost element of the cable support located at a distance from the first end of the elongated fastener less than the height of the pair of molded elements having the least height, when in contact with each other, said height being measured in the direction of the axis of the fastener-receiving passage, and in which another one of the molded elements is an endmost element in the cable support located at a distance from the second end of the elongated fastener also less than the height of the pair of molded elements having the least height, when in contact with each other, said height being measured in the direction of the axis of the fastener-receiving passage.

5. A cable support according to claim 1 in which each pair of molded elements has at least two elongated ribs extending parallel to each other, and including a strut having a wall with opposite faces and an elongated slot defined by a pair of parallel, opposed edges, one of the molded elements of the cable support being situated against one face of said wall with its elongated ribs in the slot of the strut and being in contact respectively with said parallel, opposed edges of the slot, the elongated fastener extending through the slot, and also including a nut engaged with the elongated fastener and bearing against the other face of said wall.

* * * * *